United States Patent Office 2,872,136
Patented Feb. 3, 1959

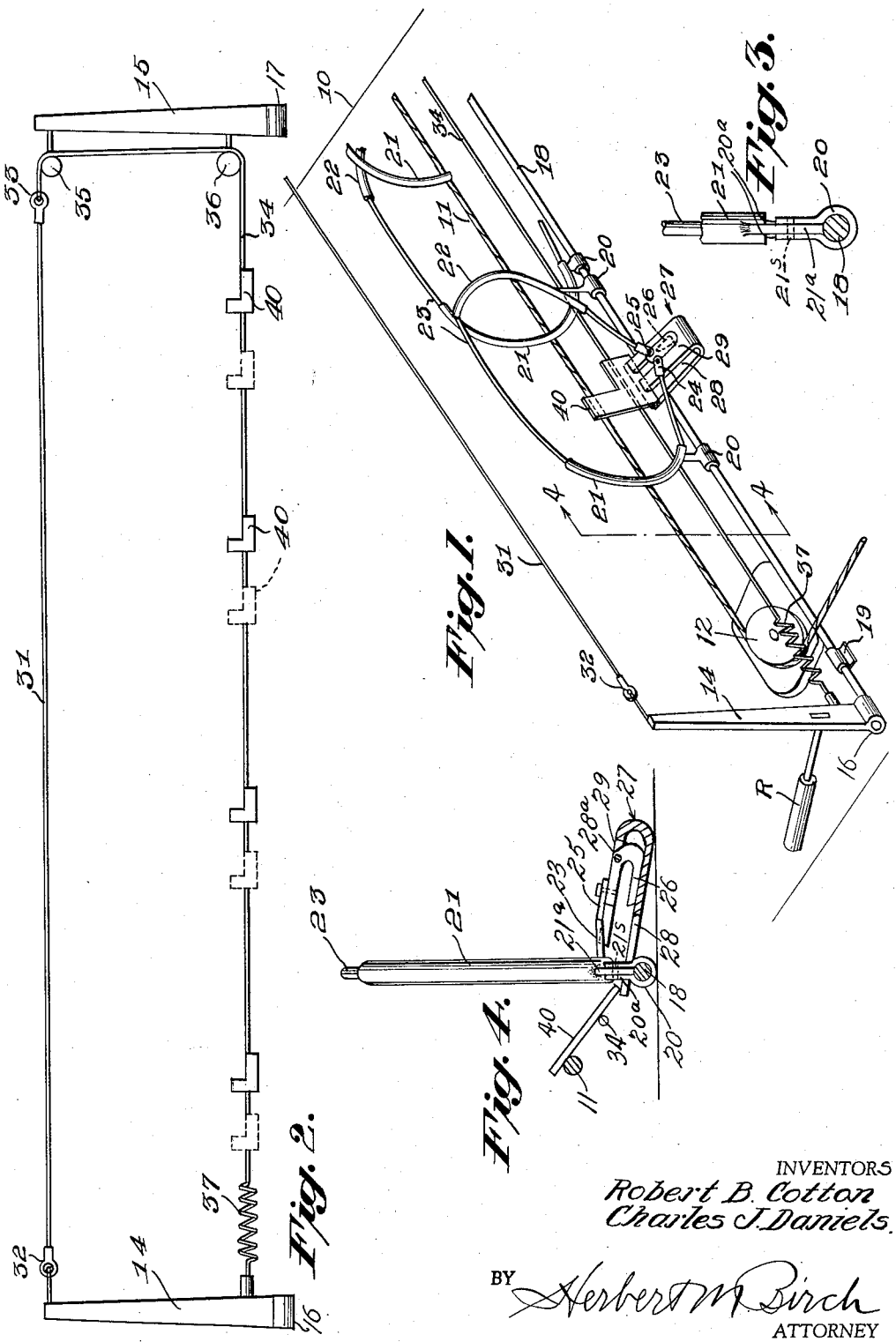

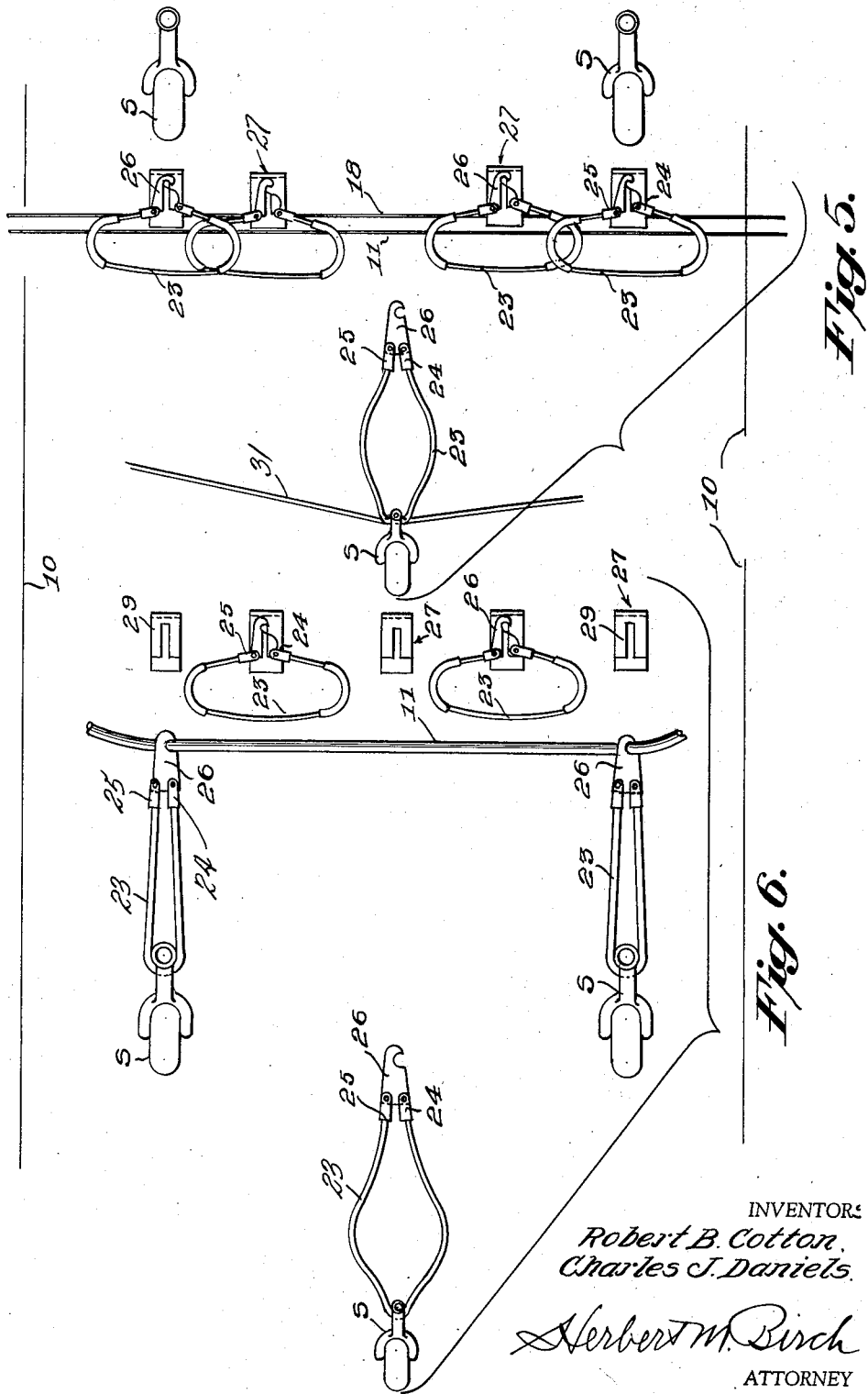

2,872,136

AIRCRAFT OVERRUN BARRIER

Robert B. Cotton, Media, Pa., and Charles J. Daniels, Wilmington, Del., assignors to All American Engineering Company, Wilmington, Del., a corporation of Delaware Application October 10, 1955, Serial No. 539,383

6 Claims. (Cl. 244—110)

The present invention relates generally to an aircraft arresting system and more particularly to aircraft landing gear engaging mechanism used in conjunction with aircraft arresting means to stop aircraft which have accidentally overrun the landing runway.

An object of the present invention is to provide a plurality of wickets comprising support members adapted to support landing gear engaging flexible loops, which are triggered and positioned into engagement with the main landing gear struts by preliminary trigger engagement of the nose wheel strut with a triggering and positioning arrangement connected therewith.

Another object is to provide an efficient and economical arresting system to prevent accidental overrun of the landing runway.

The above and other objects and advantages of the present invention will appear more fully hereinafter from a consideration of the detailed description which follows, taken with the accompanying drawings wherein one embodiment of the invention is illustrated. It is to be expressly understood, however, that the drawings are for the purpose of illustration and not intended as a definition of the limits of the invention.

In the drawings, wherein like reference characters refer to like parts throughout the several views:

Figure 1 is a partial perspective view of the approach side of the novel mechanism of the present arrest system;

Figure 2 is a front schematic view in detail of the trigger mechanisms;

Figure 3 is a detail view partly in cross section of a wicket shear link such as is adapted to release the wicket when picked up by the landing gear;

Figure 4 is a vertical sectional view substantially as observed in the plane of line 4—4 on Fig. 1;

Figure 5 is a top schematic plan view of a nose wheel strut after a trigger cable engagement and a wicket pick-up, just prior to the main landing gear wicket pick-up;

Figure 6 is a view similar to Figure 5, but showing the final pick-up and arrest cable connections of the main landing gear wickets after the first nose wheel triggering step.

Broadly, this invention consists of means, such as are hereinafter termed wickets, which engage and are picked-up first by the usual nose wheel strut of an aircraft landing gear and second by the main landing gear struts. The wickets are each formed in loops the ends of which terminate in hooks for arresting cable engagement, however the nose wheel strut wicket is so triggered and deflected that it is pulled over the top of the arresting cable and only the main landing gear wicket hooks engage the arrest cable.

Thus as the aircraft proceeds forward the arresting force is applied only to the main landing gear. Also, multiple wickets are used in laterally lapped relation across the landing runway to provide for positive engagement of the nose wheel strut and the main landing wheel struts therewith.

Referring in detail to the drawings and first with respect to Figure 1, there is for example, disclosed a landing runway 10 having an arrest cable 11 of an energy absorbing arrest gear extending across same. The arrest cable 11 is reeved around a deck or runway sheave 12 adjacent each side of the runway 10 as generally known to the art. Mounted across the runway adjacent the arrest cable 11 on the approach side thereof is a trigger frame comprised of a pair of spaced apart stanchions or posts 14 and 15 to each of which is secured a means R for holding same in vertical operative position while providing for swinging thereof to an inoperative position. These stanchions or posts are enlarged at their respective base portions and formed into coupling bushings 16 and 17, respectively, which are keyed or otherwise fixed to a cross rod 18. The rod 18 is turnably mounted in T-couplings 19 mounted in the runway surface and this mounts reversely directed T-couplings 20 for a plurality of pairs of wicket supports 21 and 22. As is indicated in Figure 3, the wicket supports 21 and 22 are provided with projections 21a disposed between spaced legs 20a of the couplings 20 and releasably secured thereto by shear pins 21s. A fluid ram R may be formed to raise and lower the posts to and from a front position. Each pair of wicket supports is so shaped, so proportioned and so spaced as to spreadably support a wicket means such as a flexible loop 23 in contiguous end lapped relation. Each of these wickets 23 is formed with coupling terminals 24 and 25 coupled to a single hook 26. The hooks, see Figs. 1 and 4, are in turn coupled to a U-shaped plate 27 by a shear pin 28a. The plate 27 includes a leg 28 secured to the top side of the trigger frame cross bar 18, and a second slotted or bifurcated leg 29 above the leg 28 and across which slot the shear pin 28a extends and is engaged by a wicket hook 26. The slot opens at the free end of the terminal plate leg 28 away from the approach side of the arrest mechanism and upon engagement by an aircraft landing gear strut or the like the pin 28a shears off and the hook 26 is released therefrom.

The several wicket hooks 26 are controlled after their shear pin release from their respective terminal plates 27 by a novel trigger mechanism supported between the stanchions or posts 14 and 15, for example, note Figure 2. The trigger mechanism comprises an upper trigger cable 31 coupled by shear link 32 to the upper portion of stanchion 14 and to the lower cable 34 by shear link 33 and which cable 34 is strung between the stanchions 14 and 15, reeved around pulleys 35 and 36 on stanchion 15, and secured through a loaded spring 37 to the lower portion of stanchion 14.

When the shear links 32 and 33 are coupled and the trigger cable 31 is pulled taut by reeving the lower cable 34 around pulleys 35 and 36 under tension of spring 37, the trigger is loaded for action. For example, the cable 34 has mounted thereon wicket hook deflector plates 40, which are held in the path of the several wicket hooks 26 and over the top of the arrest cable 11 until the shear links 32 or 33 become severed by the pulling force of the nose wheel strut of a landing aircraft, see Figure 4. Thus as illustrated in Figure 5, when a nose wheel strut picks up a wicket and breaks the shear pin 28a from its respective mounting in the wicket T-coupling and in the hook plates, the deflector plate 40 deflects the wicket hook 26 upwardly and over the arrest cable 11, while in the same operation the trigger cable 31 is forcefully extended by the nose wheel strut and the shear links 32 and 33 are broken. Promptly with the breaking of these shear links the loaded spring 37 reacts to a normal unloaded position and displaces each deflector plate 40 from the path of operatively associated wicket hook 26, whereby the hooks are no longer deflected over the arrest cable 11 and when a pair of wickets 23 are picked-up by the main landing wheel struts their respective wicket hooks couple with the arrest cable as shown in Figure 6 to stop the aircraft.

*Operation in brief*

Thus briefly the operational steps are as follows:

(1) The nose wheel strut of a landing aircraft engages one of the overlapped wickets 23 and breaks the shear pin 28a of the wicket hook 26 as well as the wicket support shear pins 21s;

(2) The hook slides over the arresting cable 11 because of a deflector plate in the path thereof;

(3) The same nose wheel strut engages the trigger cable 31 held under the static tension of the loaded spring 37;

(4) After the nose strut engages the trigger cable the shear link 32 ruptures;

(5) The spring pulls the trigger cable and the deflector plates 40 out of the way of the remaining wicket hooks 26; and (6) The final aircraft arrest step is the actual engagement with the arrest cable 11 of the respective hooks 26 of each wicket 23 picked-up by the main wheel struts as disclosed in Figure 6.

While the nose wheel strut engaged wickets in Figs. 5 and 6 are shown free of the supports 21, 22 for simplicity in illustration, it is to be understood that the wicket supports after shearing of pins 21s are carried with such wickets.

Without further description it is believed that the present invention is clearly understandable to others authorized to practice the same. While only one embodiment of the invention is described and illustrated in detail, it is to be expressly understood that other combinations, modifications and arrangements of the parts which will now probably occur to others skilled in the art are to be considered a part thereof. To determine the scope of the present invention, reference should be had to the appended claims.

What is claimed is:

1. An aircraft arresting system comprising an energy absorbing arrest cable extending across and above a runway, a plurality of nose wheel strut and main landing wheel strut engageable loop-form wickets releasably disposed across the runway in advance of and parallel with said arrest cable and normally projecting vertically above the runway, said wickets each being provided with an arrest cable engaging hook, a deflector plate normally disposed between each wicket hook and said arrest cable longitudinally of the runway for preventing engagement of the hooks with the arrest cable, and nose wheel strut engageable means connected to said deflector plates and being operative to shift said deflector plates transversely of the runway and out of longitudinal alignment with said wicket hooks whereby upon subsequent engagement of one of said wickets by the main landing gear wheel strut the hook carried by the said wicket engages the arrest cable.

2. The structure according to claim 1 wherein said wickets are disposed with overlapping end portions and wherein each of said wickets comprises a pair of supports, a rod extending transversely of the runway with which said supports have shear connections, and plates disposed upon the runway on which said hooks are normally supported and with which said hooks have shear connections.

3. The structure according to claim 1, together with fixed plates supported on the runway, each of said fixed plates being midway the length of each wicket and having a slot therein opening toward said arrest cable, said wicket hooks being releasably supported in said slots, and said wickets each comprising a support on each side of the respective fixed plate, a rod extending transversely of the runway in substantial vertical alignment with said wickets, and beneath said fixed plates, and shear connections between said supports and said rod.

4. The structure according to claim 3 wherein said fixed plates each comprise an upper leg in which said slot is disposed and a lower leg with a bend between the legs, and said deflector plates having corresponding edges thereof resting on said lower legs and having the opposite edges thereof overlying said arrest cable, and said nose wheel strut engageable means, comprising a cable having an upper nose wheel strut engageable reach and a lower reach connected to said deflector plates, means normally tensioning said lower reach, and shear links in said upper reach whereby upon rupturing of the shear links by impact of the nose wheel strut with the upper reach, the tensioned lower reach moves said deflector plates out of horizontal alignment with said hooks.

5. The structure according to claim 4, wherein said last named cable further comprises an end portion disposed between a pair of upper and lower pulleys and said upper reach being provided with a shear link adjacent each end thereof.

6. The structure according to claim 4 together with a pair of posts between which said last named cable is disposed and by which the cable is secured, and said means for normally tensioning said cable comprising a coil spring disposed between one end of said lower reach and one of said posts.

References Cited in the file of this patent

UNITED STATES PATENTS

| | | |
|---|---|---|
| 1,315,320 | Mesurier | Sept. 9, 1919 |
| 2,712,912 | Hattan | July 12, 1955 |

FOREIGN PATENTS

| | | |
|---|---|---|
| 88,985 | Switzerland | Apr. 16, 1921 |